United States Patent [19]

Bliamptis

[11] 4,244,189
[45] Jan. 13, 1981

[54] SYSTEM FOR THE MULTIPURPOSE UTILIZATION OF SOLAR ENERGY

[76] Inventor: Emmanuel Bliamptis, 20 Phinney Rd., Lexington, Mass. 02173

[21] Appl. No.: 950,117

[22] Filed: Oct. 10, 1978

Related U.S. Application Data

[63] Continuation-in-part of Ser. No. 738,976, Nov. 4, 1976, abandoned.

[51] Int. Cl.³ ............................................. F03G 7/02
[52] U.S. Cl. ....................................... 60/641; 60/675; 60/715; 126/433; 126/450
[58] Field of Search ................ 60/641, 675, 698, 715; 126/270, 271; 202/234; 203/DIG. 1

[56] References Cited

U.S. PATENT DOCUMENTS

| | | | |
|---|---|---|---|
| 2,636,129 | 4/1953 | Agnew | 203/DIG. 1 |
| 3,338,797 | 8/1967 | Hermansen et al. | 202/234 |
| 3,414,481 | 12/1968 | Kelly | 202/234 |
| 3,436,908 | 4/1969 | Van Delic | 60/641 |
| 4,122,675 | 10/1978 | Polyak | 60/641 X |

FOREIGN PATENT DOCUMENTS

| | | | |
|---|---|---|---|
| 2458457 | 7/1975 | Fed. Rep. of Germany | 60/641 |
| 2441770 | 3/1976 | Fed. Rep. of Germany | 126/270 |
| 917312 | 1/1947 | France | 60/641 |

*Primary Examiner*—Allen M. Ostrager
*Assistant Examiner*—Stephen F. Husar
*Attorney, Agent, or Firm*—Donald J. Singer; Henry S. Miller

[57] ABSTRACT

A solar energy system where the incident solar radiation evaporates a quantity of water in a distillation pond; the water vapor/air mixture rises buoyantly through a duct to a high elevation where it drives a wind turbine to produce electricity; the water is condensed out of the mixture and stored in a high elevation reservoir, where it is used to drive hydro-electric turbines; spent water is stored at a low elevation and is used for drinking, irrigation or recycling to the distillation pond.

1 Claim, 7 Drawing Figures

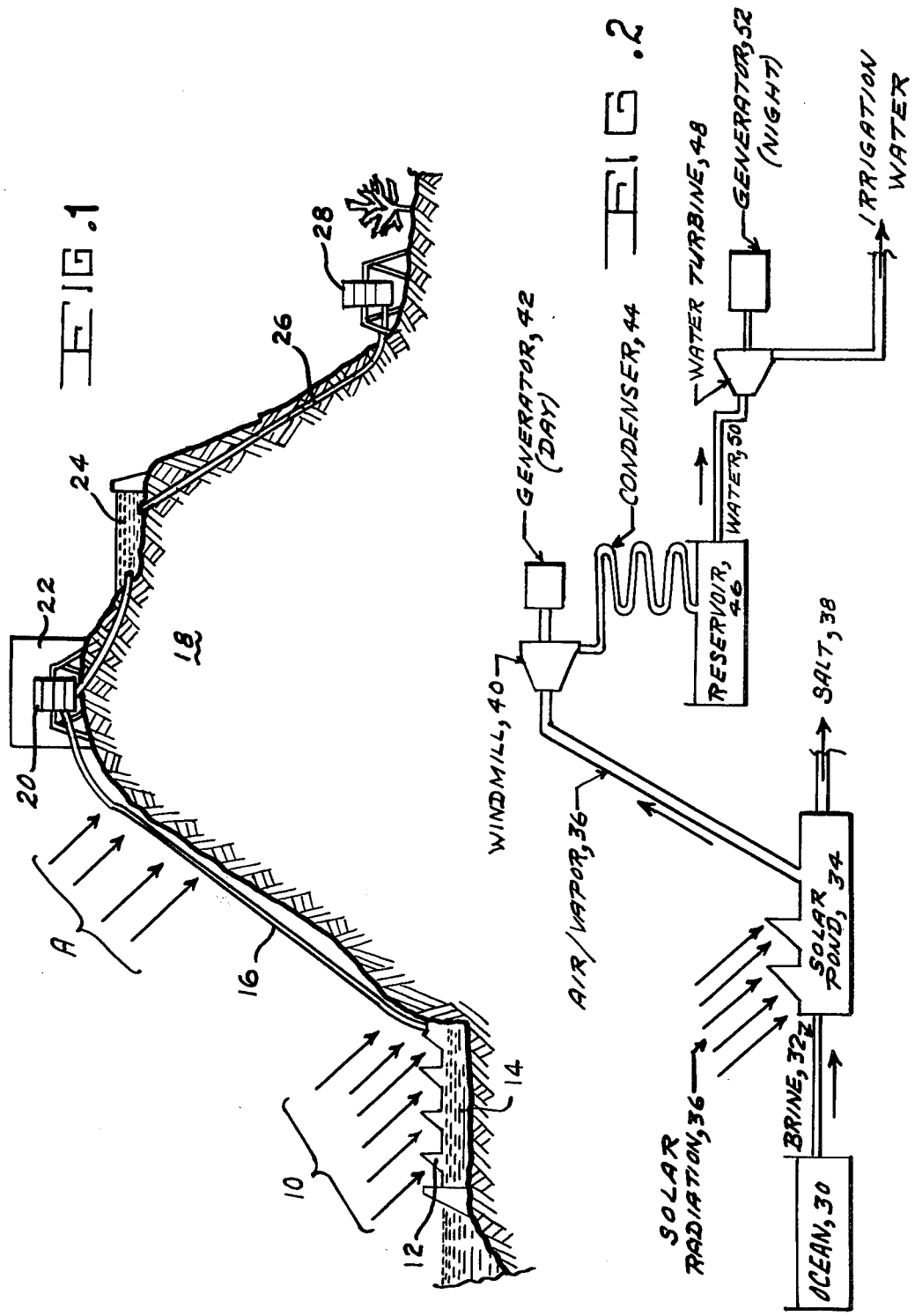

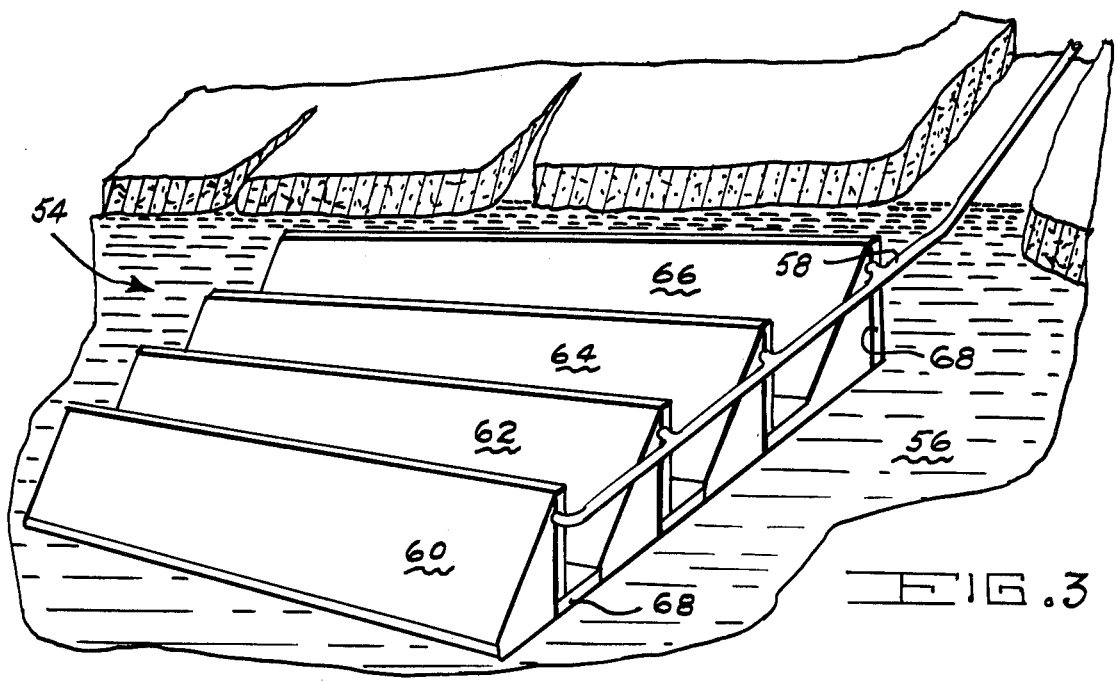
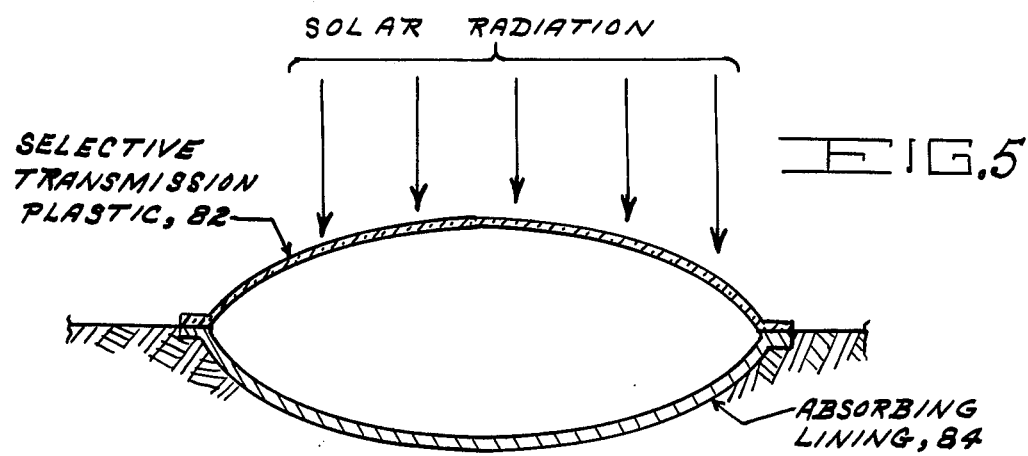
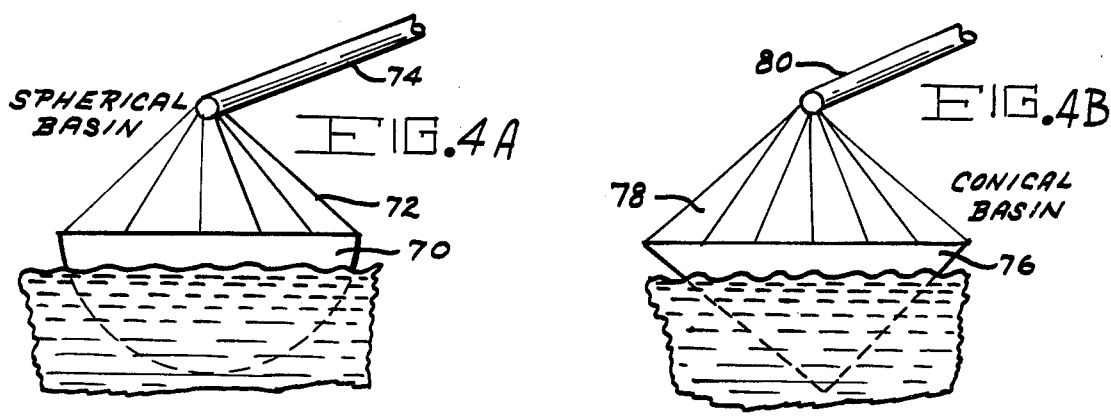

SYSTEM FOR THE MULTIPURPOSE UTILIZATION OF SOLAR ENERGY

STATEMENT OF GOVERNMENT INTEREST

The invention described herein may be manufactured and used by or for the Government for governmental purposes without the payment of any royalty thereon.

This is a continuation-in-part of co-pending patent application Ser. No. 738,976 filed Nov. 4, 1976, now abandoned, entitled SYSTEM FOR THE MULTIPURPOSE UTILIZATION OF SOLAR ENERGY.

BACKGROUND OF THE INVENTION

This invention relates generally to a system for converting solar energy into electrical energy and more specifically, to a system that will utilize solar energy for multiple purposes including electrical energy and for the production of potable water for drinking and irrigation purposes.

Solar radiation comes to the earth at an average rate of approximately 1.35 kilowatts per square meter. This is the so called solar constant, (frequently given as 1.94 cal/cm$^2$min).

The total solar radiation intercepted by the earth is $1.73 \times 10^{17}$ watts which is equivalent to about 75,000 times the total power used in the United States during 1970. Stated in a different way, in 1970, the land area of the United States received from the sun about 1000 times as much energy as it consumed. In passing through the atmosphere a fraction of this radiation is scattered away from the earth. The fraction reaching the surface of the earth, however, is quite substantial. Since the potential benefits from extensive use of solar energy are so great it is imperative to explore the possibilities of using it on a large scale to meet the long range energy needs of the human race.

Various large scale schemes have been proposed for tapping this source of power which is practically of infinite duration (about 200 million human generations). By comparison the expected durations of some other sources of energy are petroleum: 1-2 human generations
coal: 15-20 human generations
"atomoic fuel": 50-100 human generations
(1 human generation is considered to be about 30 years.)

A solar sea power scheme proposes to use the temperature difference between the ocean surface water and the bottom to run a thermal engine. Such installations would be located preferentially in deep tropical waters where the temperature differences are higher and less variable than elsewhere. The central tower solar farm concept proposes to use a large field of sun tracking mirrors which reflect the solar radiation to a boiler on top of a central tower. The concentrated solar power is used then to drive a thermal engine at relatively high temperatures. Although not stated by the proposers of this scheme, advantage may be taken of favorable terrain morphology. An example of such terrain is the North Panamint Valley in California where an isolated peak is in the middle of a valley which opens amphitheatrically to the south.

A third scheme for harnessing solar energy proposes to use satellites in geostationary orbit which collect the solar energy, convert it to electrical form and transmit it to earth with microwave beams. Each of the schemes offers the potential advantage of adding a substantial amount of available energy to the declining present resources. Furthermore, these proposals offer to high technology nations the possibility of becoming independent of fossil fuels. However, they all require the investment of substantial amount of new technology which postpones their actual development. In addition, they lack inherent provisions for energy storage to meet fluctuating demands.

SUMMARY OF THE INVENTION

The invention proposed herein takes maximum advantage of the terrain and structures with a large elevation differential, incorporates energy storage and is based on technology that is largely available today. Also, its overall effectiveness in capturing and utilizing the power of the sun is high due to its multiple objectives which result in several useful products.

Briefly, the system of the invention consists of the following parts: (a) a solar distillation pond, (b) a vapor/air duct, (c) a high elevation installation, (d) a high elevation water reservoir, (e) a hydroelectric generating station, and (f) a low elevation reservoir for irrigation or drinking water.

The invention is intended to operate in the following general manner. The incident solar radiation evaporates a quantity of water in the distillation pond. The water vapor/air mixture rises buoyantly through the duct to a high elevation where it drives a turbine to produce electricity. In the high elevation installation, the water is condensed out of the mixture. This water is stored in the high elevation reservoir and used to drive a series of hydraulic turbines until all possible energy has been extracted from the water. The spent water is then stored in the low elevation reservoir and is available for irrigation, drinking or reprocessing to the high elevation reservoir.

A typical installation of one square kilometer may yield 100 megawatts (electric) or more continuously, and 5 million cubic meters of fresh water per year. The invention would be installed ideally in a location where there are high mountains relatively near large bodies of water. Alternatively it could be used with tall buildings to provide cooling and a source of water for fire protection.

Where solar energy is utilized by means of a distillation pond located in shallow coastal waters, for example, the warm air/water vapor mixture is channelled to a high elevation by means of a guideway (tube) of diminishing cross section. Such a guideway may be the upper portion of a river bed or a wadi. The incident solar energy heats up the air and evaporates some water. The kinetic energy of the air/vapor mixture can be used to drive a turbine or a fan thereby generating electric power. If the elevation of the generating station is sufficient, a throttling process can be incorporated to produce condensation of the moisture contained in the mixture. The water thus obtained can be stored for generating electricity during the hours of no insolation and for irrigation.

It is therefore an object of the invention to provide a new and improved system for solar energy utilization.

It is another object of the invention to provide a new and improved system for solar energy utilization that is multipurposed.

It is a further object of the invention to provide a new and improved system for solar energy utilization that is low in cost and easily maintained.

It is still another object of the invention to provide a new and improved system for solar energy utilization that utilizes current technology.

It is still a further object of the invention to provide a new and improved system for solar energy utilization that is non-polluting.

It is another object of the invention to provide a new and improved system for solar energy utilization that produces fresh water.

It is another object of the invention to provide a new and improved system for solar energy utilization that includes the non-intermittent production of electrical power.

It is another object of the invention to provide a complete system for the large scale production of electricity from solar energy.

These and other advantages, features and object of the invention will become more apparent from the following description taken in connection with the illustrative embodiment in the accompanying drawings.

DESCRIPTION OF THE DRAWINGS

FIG. 1 is a pictorial representation of the invention.

FIG. 2 is a schematic representation of the invention.

FIG. 3 is a pictorial representation of a solar pond.

FIG. 4A and 4B are pictorial representations of alternative forms of solar collectors.

FIG. 5 is the representation of a typical cross-section of the duct.

DESCRIPTION OF THE PREFERRED EMBODIMENT

Figure 6:
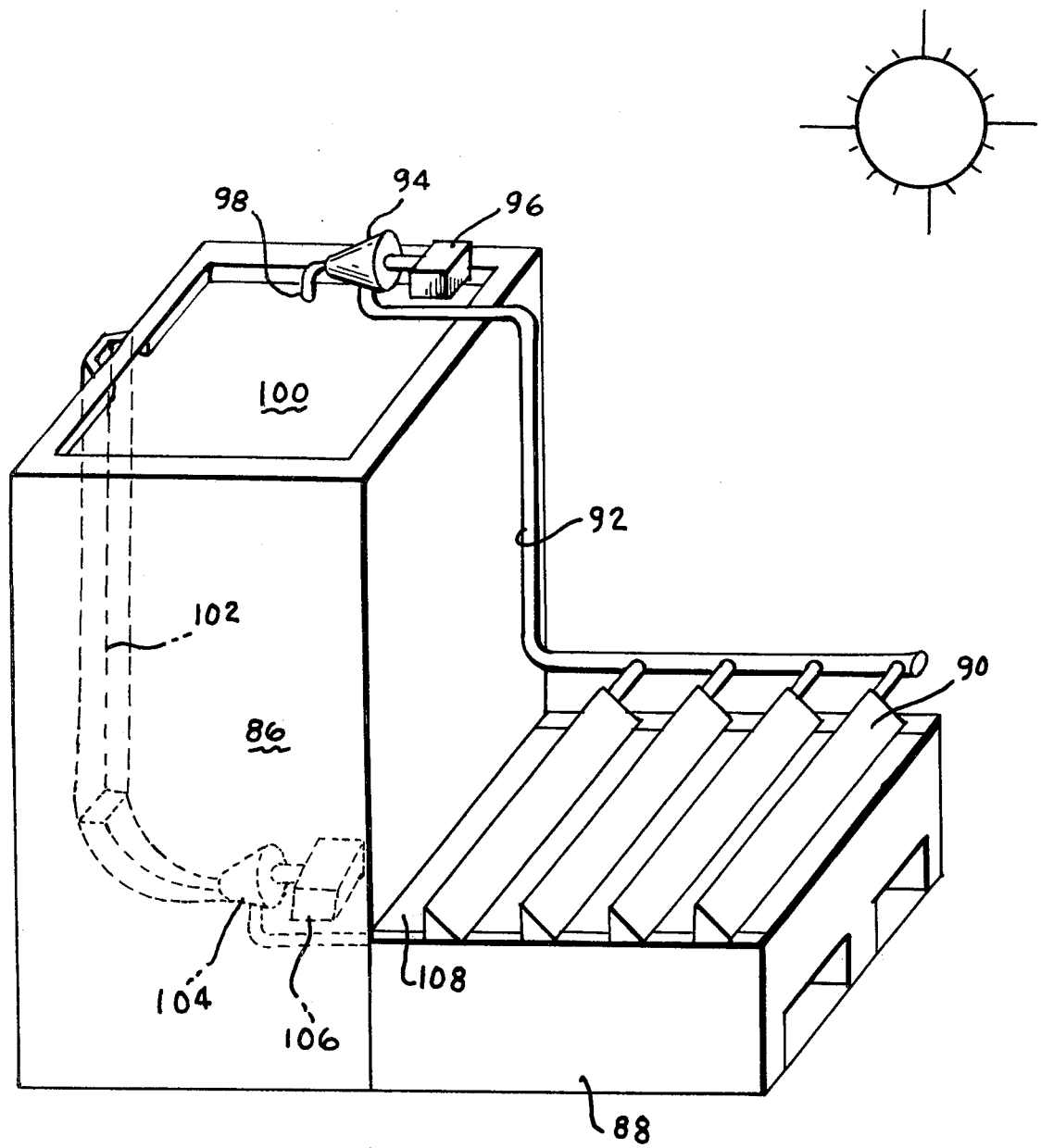
FIG. 6 is a pictorial representation of the invention used with a structure having a substantial elevation differential.

Referring now to FIG. 1, there is shown a system with the multipurpose utilization of solar energy. Solar radiation 10, direct and indirect, impinges upon the cover 12 of the solar distillation pond 14 and causes the evaporation of a quantity of water. The cover 12 is transparent to shortwave solar radiation but opaque to longwave earth radiation. The vapor/air mixture rises buoyantly through the duct 16 constructed along the topography of a hill or mountain 18. Kinetic energy contained by the upward moving mixture drives a wind turbine 20 located at the high point of the system. The turbine is connected to an electrical generator to produce electrical energy.

After the production of electrical energy, the mixture is cooled so that the water in the mixture is precipitated out in a cooling tower 22 and stored in the high elevation reservoir 24. The reservoir 24 provides a supply of water via pipeline 26 to the hydraulic turbines 28 which may be utilized to provide a continuous supply of electrical energy.

After the production of electrical energy, the mixture is cooled so that the water in the mixture is precipitated out in a cooling tower 22 and stored in the high elevation reservoir 24. The reservoir 24 provides a supply of water via pipeline 26 to the hydraulic turbines 28 which may be utilized to provide a continuous supply of electrical energy.

Water available after driving the turbine generating equipment may then be distributed for irrigation purposes or in the alternative, stored in a reservoir for drinking and domestic use. A closed system is also possible with the invention, where the condensed water would be ultimately fed into the solar pond (14) and continuously recycled.

FIG. 2 shows the system when utilized in or near the ocean 30, and brine is allowed to flow via ducts 32 to the solar pond 34. As the solar radiation impinges the solar pond, the air-water vapor mixture passes upward along duct 36 while the salt remaining is removed at 38. The turbine 40 drives the generator 42 for the daytime generation of electrical energy by the rising mixture. Water in the mixture is condensed at 44 and stored in the reservoir 46. Water stored in the reservoir is released at night and fed to the water turbine 48 via duct 50 to drive generator 52. Water passing through the turbine is then stored (53) or released for irrigation or other purposes.

Concerning FIG. 3, a desirable type of solar radiation collector is shown generally at 54. The collector is supported by legs or other appropriate structure fixed to the strata below. The solar collector 54 is positioned in concert with the surface of the water 56. In one form, water forms the seal causing the vapor evaporated by the solar radiation to rise and pass via duct 58 to the highest point in the system. Solar radiation reaches the surface 60, 62, 64, 66, which are formed of a material allowing short wave solar radiation to pass, but rejecting long wave radiation. Examples of such materials are several types of glass, and some plastics, such as polyvinyl fluoride, polyethylene, transparent acrylics, etc. These materials need not be wettable. The solar surfaces are supported by a concrete or steel frame 68 sufficiently strong to support the surfaces regardless of wave intensity or size.

Alternative forms of distillation ponds are shown in FIGS. 4A and 4B. In the former, a spherical basin 70 is used which would be cast in situ of concrete or other suitable material having a rough inner surface. Solar receiving surfaces 72 form a cone having a duct 74 at the apex to transport the evaporated mixture. The basin would become highly reflective after some (ocean) use due to the salt precipitating out and collecting on the rough inner surface of the basin. The shape of the basin causes a focal surface to be formed where the temperature will be high, thereby achieving greater efficiencies.

The conical solar pond is shown in FIG. 4B with a conical basin 76 constructed in a manner similar to that shown in FIG. 4A except to shape. Radiation passing through the panels 78 is focused by the shape of the structure causing evaporation. The vapor-mixture is moved to a turbine generator via duct 80.

A cross sectional view of a duct for carrying the air-vapor mixture is shown in FIG. 5 The duct has special geometry which intensifies incident solar radiation. The duct shown generally at 82 has a plastic or mylar surface allowing selected radiation to pass therethrough. Absorbing lining 84 makes up the remainder of the duct. The shape of the duct is generally elliptical, thereby providing partial focusing of the radiation and hence higher temperature and increased efficiency.

FIG. 6 shows the invention utilized with a high structure, supplementing conventional power supply and cooling means. The structure or building is shown at 86. A parking garage with an artificial pond on the roof is shown at 88 although a natural pond would be adequate. A solar collector 90 (similar to that shown in FIG. 3) is mounted over the roof of the garage which would have a conventional black, heat absorbing roof. The roof would be sealed and water vapor passes through duct 92 which is shown in FIG. 5.

On the roof top, windmill 94 would turn generator 96 and provide supplementary power for the building. Condensed water would flow via duct 98 into pond 100 where it would aid in cooling the building. The water would thus flow through duct 102 down to the level of the lower pond. Water from pond 100 could also be directed through air conditioning units located inside the structure to provide supplementary cooling. Additionally, provision could be made to connect duct 102 to a fire protection system for an instant supply of water on upper floors of the building.

Water travelling through duct 102 would, according to the invention pass through water turbine 104 which turns generator 106 before flowing into artificial pond 109.

Depending upon the area where building is located the rainfall could be used to provide water lost to evaporation from the rooftop pond. Alternatively, the rooftop pond could be sealed and the entire system closed to the atmosphere. If this were the case, materials other then water might be considered as an appropriate fluid to increase the efficiency of the system.

Although the invention has been described with reference to particular embodiments, it will be understood to those skilled in the art that the invention is capable of a variety of alternative embodiments within the spirit and scope of the appended claims.

I claim:

1. A system for the multipurpose utilization of solar energy, adapted for use in combination with multi-storied buildings, comprising: a building roof area at a first elevation, adapted for storing and exposing water to incident solar radiation; a building roof area at a second elevation, greater than said first elevation, adapted for storing water; a solar collector mounted over the building's roof at said first elevation and including airtight means for collecting vapors of the water generated by incident solar radiation; a first electromagnetic generator means mounted on the building roof at the second elevation; a first turbine means operatively connected to the first generator means; duct means, including an elliptically shaped tubular member formed of two half members, where one half member is constructed of a material that will selectively pass solar radiation, and the other half member is constructed of a material that will absorb radiation passing through the first half member and heat the contents of the tubular member, connecting the vapor collection means at the first elevation and the first turbine means, whereby vapors collected and passing through the said tubular member cause said first turbine to operate; means connected to the first turbine for depositing water condensed in the first turbine on the building roof area at the second elevation; a second electromagnetic generating means; a second turbine means operatively connected to the second electromagnetic generating means; duct means connecting the second building roof storage area to the second turbine, whereby water from the roof storage area will descend and cause the second turbine to operate, and means connected to the second turbine for directing water output from the second turbine to the first building roof storage area.

* * * * *